United States Patent Office 2,868,768
Patented Jan. 13, 1959

2,868,768

PROCESS FOR THE PREPARATION OF CONDENSATION PRODUCTS

Wolfgang Förster, Hamburg, Germany, assignor to Reichhold Chemicals, Inc., Detroit, Mich.

No Drawing. Application September 13, 1955
Serial No. 534,160

2 Claims. (Cl. 260—59)

The invention relates to carboxylic condensation products of the epoxy type, and to the process of making the same.

It is known that resins that contain two or more epoxy groups in the molecule can be hardened into hard insoluble and infusible masses with dibasic or polybasic acids or their anhydrides.

It has now been found that resins that contain in addition to epoxy groups, carboxyl groups in the same molecule also represent very serviceable products that are self-hardening. That they should exhibit properties of this kind without the use of a hardener is the more surprising since simply constructed compounds, such for example as salicyclic acid etherified with epichlorhydrin, are not heat-hardenable.

The present invention is concerned with a process for the preparation of heat-hardenable condensation products from polyvalent polynuclear phenols, such as are obtained by condensing phenols with formaldehyde under acidic conditions. A part of the phenolic hydroxyls (about 34–50% as shown in the following examples) are etherified in alkaline solution with α-halogen fatty acid; the remaining hydroxyls are converted with epihalogen hydrin or dihalogen hydrin under alkaline conditions.

Novolaks produced by acid condensation of phenols with formaldehyde are very well suited as initial materials. The mol ratio of epihalogen hydrin or dihalogen hydrin to α-halogen fatty acid can be greatly varied without departing from my invention in its broadest aspects. However, for the attainment of maximum chemical resistance it is advisable not to allow the carboxyls to preponderate and to choose a ratio of approximately 1:1.

Generally stated, my process comprises the preparation of hardenable condensation products wherein at least one polyvalent polynuclear phenol of the novolak type, partially etherified with haloacetic acid, is reacted with a member of the group consisting of epihalohydrins in alkaline solution. The following specific examples are given by way of illustration rather than by way of limitation, and it will be understood that in place of the epichlorhydrin referred to therein other epihalogen hydrins or dihalogen hydrins may be employed, and in place of chloroacetic acid other α-halogen fatty acids may be employed without departing from the spirit of the invention:

*Example I*

1000 g. of phenol, 222 g. of formaldehyde solution (36%) and 10 g. of oxalic acid are heated to boiling for two to three hours and the excess phenol is distilled off in vacuum. About 450 g. of novolak is the result.

450 g. of novolak is dissolved in a solution of 284 g. of sodium hydroxide in 3 liters of water and to the solution heated to 90° C. there is gradually added 144 g. of chloroacetic acid, dissolved in the same quantity of water. After one hour's duration of reaction 265 g. of epichlorhydrin is added at 60–75° C. with stirring. Upon addition of hydrochloric acid a resin separates that is washed free of alkali and salt with hot water and is dried on the water bath under vacuum.

Solutions of this resin when burnt in give hard, elastic films.

*Example II*

756 g. of p-cresol, 292 g. of formaldehyde solution (36%) and 8 g. of oxalic acid are condensed refluently with stirring for 2–3 hours at boiling temperature and the excess cresol is distilled off under vacuum. Approximately 530 g. of novolak is the result.

468 g. of the cresol novolak is dissolved in 2560 g. of 10% soda lye and the solution is converted at 90–95° C. with 189 g. of chloroacetic acid, which was dissolved in the same quantity of water. It is then allowed to cool to 60–70° C. and 222 g. of epichlorhydrin is added with stirring. After a few minutes the sodium compound separates from the resin and it is dissolved in a mixture of water and glycol monoethyl ether in the ratio of 1:1. Upon conversion with hydrochloric acid a highly viscous resin precipitates, which is dried on the water bath in vacuum.

*Example III*

344 g. of bisphenol A (techn. diphenylol propane) is dissolved in 1930 g. of 10% soda lye and is converted at 90–95° C. with 143 g. of chloroacetic acid, which is dissolved in the same quantity of water. After an hour 170 g. of epichlorhydrin is allowed to enter the solution 60–70° C. warm with stirring and after a half hour's duration of reaction with dilute hydrochloric acid a highly viscous product is obtained that is dried on the water bath in vacuum.

I claim:

1. A process for the preparation of hardenable epoxy carboxylic acid condensation products, characterized by the fact that a polyvalent polynuclear phenol, wherein about 34–50% of its hydroxyls have been etherified by heating with haloacetic acid in alkaline medium, is reacted with an epihalogen hydrin in an amount equivalent to the free hydroxyls, in alkaline solution, the said polynuclear polyvalent phenol being formed by heating a member of the group consisting of phenol and cresols with formaldehyde and an acidic catalyst for several hours at reflux temperature.

2. A hardenable condensation product produced in accordance with claim 1.

References Cited in the file of this patent

UNITED STATES PATENTS

| | | |
|---|---|---|
| 2,444,594 | Day et al. | July 6, 1948 |
| 2,507,910 | Keiser et al. | May 16, 1950 |
| 2,659,710 | Martin | Nov. 17, 1953 |